(12) United States Patent
Ramamohan et al.

(10) Patent No.: US 12,493,645 B2
(45) Date of Patent: Dec. 9, 2025

(54) TAGGING TELECOMMUNICATION INTERACTIONS

(71) Applicant: Capital One Services, LLC, McLean, VA (US)

(72) Inventors: Deepak Ramamohan, Mysuru (IN); Purna Prasanna Srikar Raju Regati, Andhra Pradesh (IN)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/537,150

(22) Filed: Dec. 12, 2023

(65) Prior Publication Data

US 2025/0190476 A1    Jun. 12, 2025

(51) Int. Cl.
  *G06F 16/35* (2025.01)
  *G06F 16/355* (2025.01)

(52) U.S. Cl.
  CPC .................. *G06F 16/355* (2019.01)

(58) Field of Classification Search
  CPC .................................................. G06F 16/355
  See application file for complete search history.

(56) References Cited

U.S. PATENT DOCUMENTS

| | | | | |
|---|---|---|---|---|
| 8,996,371 | B2 * | 3/2015 | Hurvitz | G10L 15/183 704/235 |
| 9,483,557 | B2 | 11/2016 | Thambiratnam et al. | |
| 9,787,838 | B1 * | 10/2017 | Lembersky | H04M 3/5191 |
| 10,002,129 | B1 * | 6/2018 | D'Souza | G06F 40/289 |
| 2003/0014448 | A1 * | 1/2003 | Castellanos | G06F 40/247 715/234 |
| 2007/0067281 | A1 * | 3/2007 | Matveeva | G06F 16/334 707/999.005 |
| 2016/0157776 | A1 * | 6/2016 | Mestha | A61B 5/02438 600/479 |
| 2020/0110882 | A1 * | 4/2020 | Ripolles Mateu | G06F 16/353 |
| 2021/0312361 | A1 * | 10/2021 | Daley | G06N 20/00 |
| 2022/0374598 | A1 * | 11/2022 | Osuala | G06F 40/279 |
| 2024/0412723 | A1 * | 12/2024 | Kim | G10L 15/26 |

* cited by examiner

*Primary Examiner* — Md I Uddin
*Assistant Examiner* — Earl Levi Elias
(74) *Attorney, Agent, or Firm* — Harrity & Harrity, LLP

(57) ABSTRACT

In some implementations, a device may obtain a data set that indicates scores for first terms based on association scores between the first terms and second terms. The association scores may be based on occurrences of the first terms in electronic documents that provide transcripts relating to telecommunication interactions, and occurrences of the second terms in electronic records that provide summaries relating to the telecommunication interactions. The device may process an electronic document, that provides a transcript relating to a new telecommunication interaction involving an agent device and a user device, to extract candidate key phrases from the transcript. The device may determine a relevance score for each candidate key phrase based on the score(s), of the data set, associated with the first term(s) in the candidate key phrase. The device may generate tag(s) for the new telecommunication interaction based candidate key phrase(s) associated with highest relevance score(s).

20 Claims, 11 Drawing Sheets

105
Generate a plurality of electronic documents based on media content

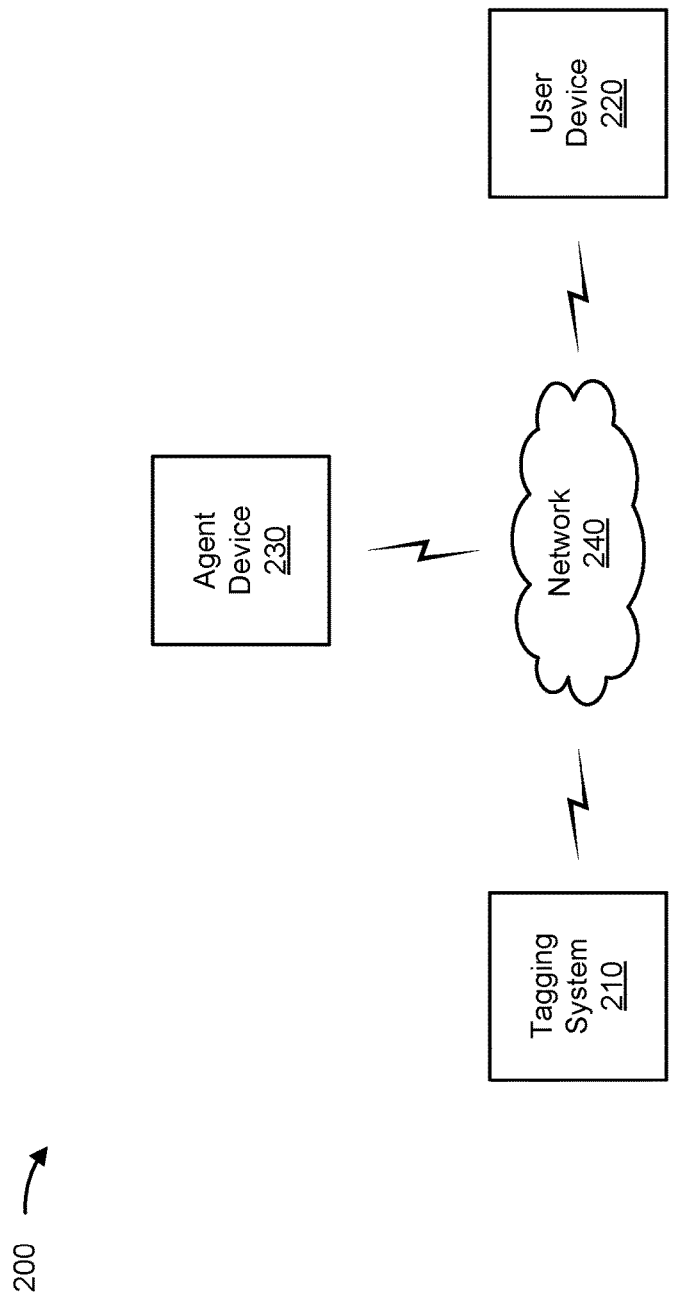

TAGGING TELECOMMUNICATION INTERACTIONS

BACKGROUND

Tagging can be used to associate resources, such as electronic documents, media files, electronic document repositories, web pages, or the like, with key phrases that indicate contents of the resources. The tagging of the resources may assist with electronic searching, organization, analytics, or the like.

SUMMARY

Some implementations described herein relate to a system for tagging telecommunication interactions. The system may include one or more memories and one or more processors communicatively coupled to the one or more memories. The one or more processors may be configured to retrieve a plurality of electronic documents that provide transcripts relating to a plurality of telecommunication interactions involving one or more agent devices and one or more user devices, and a plurality of electronic records that provide agent-prepared summaries relating to the plurality of telecommunication interactions. The one or more processors may be configured to scan the plurality of electronic documents and the plurality of electronic records to generate a first index of first terms present in the transcripts and a second index of second terms present in the agent-prepared summaries, where the first index and the second index define a plurality of term pairs each including a first term of the first index and a second term of the second index. The one or more processors may be configured to determine respective association scores for the plurality of term pairs. The one or more processors may be configured to generate a data set that indicates a plurality of scores for the first terms based on respective highest association scores, of the respective association scores, for the first terms. The one or more processors may be configured to process an electronic document, that provides a transcript relating to a new telecommunication interaction involving an agent device and a user device, using an artificial intelligence model, to extract a plurality of candidate key phrases from the transcript. The one or more processors may be configured to determine a relevance score for each candidate key phrase, of the plurality of candidate key phrases, based on one or more of the plurality of scores, of the data set, associated with one or more of the first terms in the candidate key phrase. The one or more processors may be configured to generate one or more tags for the new telecommunication interaction based on one or more candidate key phrases, of the plurality of candidate key phrases, associated with highest relevance scores.

Some implementations described herein relate to a method of tagging telecommunication interactions. The method may include obtaining, by a device, a data set that indicates a plurality of scores for first terms based on association scores between the first terms and second terms, where the association scores are based on occurrences of the first terms in a plurality of electronic documents that provide transcripts relating to a plurality of telecommunication interactions involving one or more agent devices and one or more user devices, and occurrences of the second terms in a plurality of electronic records that provide agent-prepared summaries relating to the plurality of telecommunication interactions. The method may include processing, by the device, an electronic document, that provides a transcript relating to a new telecommunication interaction involving an agent device and a user device, using an artificial intelligence model, to extract a plurality of candidate key phrases from the transcript. The method may include determining, by the device, a relevance score for each candidate key phrase, of the plurality of candidate key phrases, based on one or more of the plurality of scores, of the data set, associated with one or more of the first terms in the candidate key phrase. The method may include generating, by the device, one or more tags for the new telecommunication interaction based on one or more candidate key phrases, of the plurality of candidate key phrases, associated with highest relevance scores.

Some implementations described herein relate to a non-transitory computer-readable medium that stores a set of instructions. The set of instructions, when executed by one or more processors of a device, may cause the device to retrieve a plurality of electronic documents that provide transcripts relating to a plurality of telecommunication interactions involving one or more agent devices and one or more user devices, and a plurality of electronic records that provide agent-prepared summaries relating to the plurality of telecommunication interactions. The set of instructions, when executed by one or more processors of the device, may cause the device to scan the plurality of electronic documents and the plurality of electronic records to generate a first index of first terms present in the transcripts and a second index of second terms present in the agent-prepared summaries. The set of instructions, when executed by one or more processors of the device, may cause the device to identify, from the first index and the second index, a plurality of term pairs each including a first term of the first index and a second term of the second index. The set of instructions, when executed by one or more processors of the device, may cause the device to determine respective association scores for the plurality of term pairs. The set of instructions, when executed by one or more processors of the device, may cause the device to generate a data set that indicates a plurality of scores for the first terms based on respective highest association scores, of the respective association scores, for the first terms.

BRIEF DESCRIPTION OF THE DRAWINGS

FIG. 2 is a diagram of an example environment in which systems and/or methods described herein may be implemented, in accordance with some embodiments of the present disclosure.

DETAILED DESCRIPTION

The following detailed description of example implementations refers to the accompanying drawings. The same reference numbers in different drawings may identify the same or similar elements.

Tagging can be used to associate resources, such as electronic documents, media files, electronic document repositories, web pages, or the like, with key phrases that indicate contents of the resources. As one example, a transcript relating to a customer service call may be tagged with key phrases to enable the transcript to be subsequently located or used for analytics. For example, the transcript may be analyzed using a tagging process to identify key phrases for the transcript. In general, a relevance of the key phrases identified by the tagging process to an actual purpose of the customer service call may be dependent on a richness of information in the transcript, a length of the transcript, whether the transcript includes transcription errors, an amount of noise in the transcript (e.g., off-topic conversation), or the like. Accordingly, the transcript may be tagged with key phrases that have little or no relevance to the actual purpose of the customer service call. As a result, downstream uses involving low-relevance tags may consume excessive computing resources (e.g., processor resources and/or memory resources). For example, locating a transcript of interest based on tags may involve multiple failed attempts, each attempt consuming additional computing resources.

Some implementations described herein enable efficient and accurate tagging for telecommunication interactions. In some implementations, key phrases used for the tagging may be based on electronic documents that provide transcripts of telecommunication interactions as well as electronic records providing human-generated summaries relating to the telecommunication interactions. For example, a data set of scores for the terms in the transcripts may be generated based on co-occurrences of the terms in the transcripts and the terms in the summaries and using pointwise mutual information values. Candidate key phrases may then be extracted from a transcript and ranked for relevancy based on the scores of the data set. By using two different types of sources (e.g., the transcripts and the summaries), the telecommunication interactions can be tagged accurately even if the transcripts are vague, lengthy, include transcription errors, and/or excessive noise. The accurate tagging of the telecommunication interactions conserves computing resources expended in connection with downstream uses. For example, accurate tagging may enable transcripts of interest to be located using fewer attempts.

FIGS. 1A-1H are diagrams of an example 100 associated with tagging telecommunication interactions. As shown in FIGS. 1A-1H, example 100 includes a tagging system, a user device, and an agent device. These devices are described in more detail in connection with FIGS. 2 and 3.

Figure 1A:
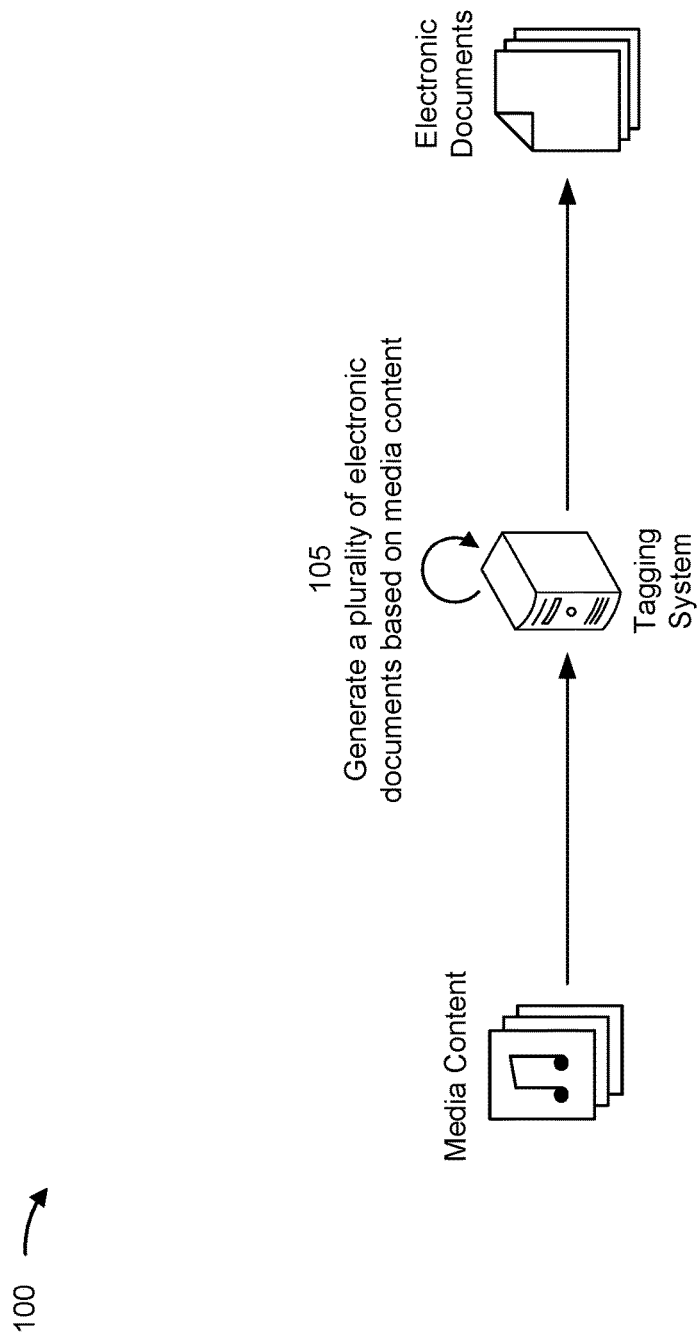
FIGS. 1A-1H are diagrams of an example associated with tagging telecommunication interactions, in accordance with some embodiments of the present disclosure.

As shown in FIG. 1A, and by reference number 105, the tagging system may generate a plurality of electronic documents based on media content. The media content may include one or more digital audio files, one or more digital video files, and/or one or more text chat records, among other examples. The media content may memorialize (e.g., as recordings) a plurality of telecommunication interactions (e.g., long-distance interactions made via a telephone network, the Internet, or the like) involving one or more agent devices associated with one or more agents (e.g., human agents and/or artificial intelligence (AI) agents) and one or more user devices associated with one or more users. For example, the telecommunication interactions may be associated with telephone calls (e.g., voice calls and/or video calls) placed to a call center, and/or the telecommunication interactions may be associated with text chat sessions. As an example, the telecommunication interactions may be customer service interactions (e.g., conversations) between the one or more users (e.g., that are seeking customer service) and the one or more agents (e.g., that are providing the customer service). The tagging system may retrieve the media content from a document repository that stores a plurality of media content files.

The electronic documents generated by the tagging system may provide transcripts relating to the telecommunication interactions. For example, for a particular telecommunication interaction, the tagging system may process audio (e.g., speech) of media content, for the telecommunication interaction, using a speech-to-text technique (e.g., implemented by a speech-to-text engine) to generate text (e.g., a transcript) associated with the telecommunication interaction. In some implementations, the text may include words identified in the audio, timestamps associated with groups of words (e.g., utterances, sentences, and/or paragraphs), and/or indications of whether a speaker of a group of words is a first speaker (sometimes referred to as a "first channel" or "channel 1") or a second speaker (sometimes referred to as a "second channel" or "channel 2"). Continuing with the example, the tagging system may generate the electronic document based on the text.

In some implementations, the tagging system may generate text and/or an electronic document in real time during a telecommunication interaction. For example, during the telecommunication interaction, the tagging system may process audio (e.g., speech) associated with the telecommunication interaction using a speech-to-text technique in real time to generate text associated with the telecommunication interaction. The tagging system may then generate the electronic document based on the text at a completion of the telecommunication interaction, or in a progressive manner during the telecommunication interaction.

Furthermore, in connection with the telecommunication interactions, the one or more agents may prepare summaries of the telecommunication interactions that are stored in a plurality of electronic records. For example, during or following a telecommunication interaction, an agent that participated in the telecommunication interaction may prepare a summary of the telecommunication interaction (e.g., indicating topics that were discussed, any resolutions that were reached, or the like), and the summary may be stored in an electronic record. An electronic document providing a transcript associated with a telecommunication interaction may be mapped to an electronic record providing a summary associated with that telecommunication interaction. For example, a transcript associated with a telecommunication interaction may be mapped to an agent-prepared summary associated with that telecommunication interaction. A mapped electronic document/transcript and electronic record/agent-prepared summary may define a data point. The plurality of electronic documents/transcripts mapped with the plurality of electronic records/agent-prepared summaries may define a corpus used for tagging telecommunication interactions, as described herein.

Figure 1B:
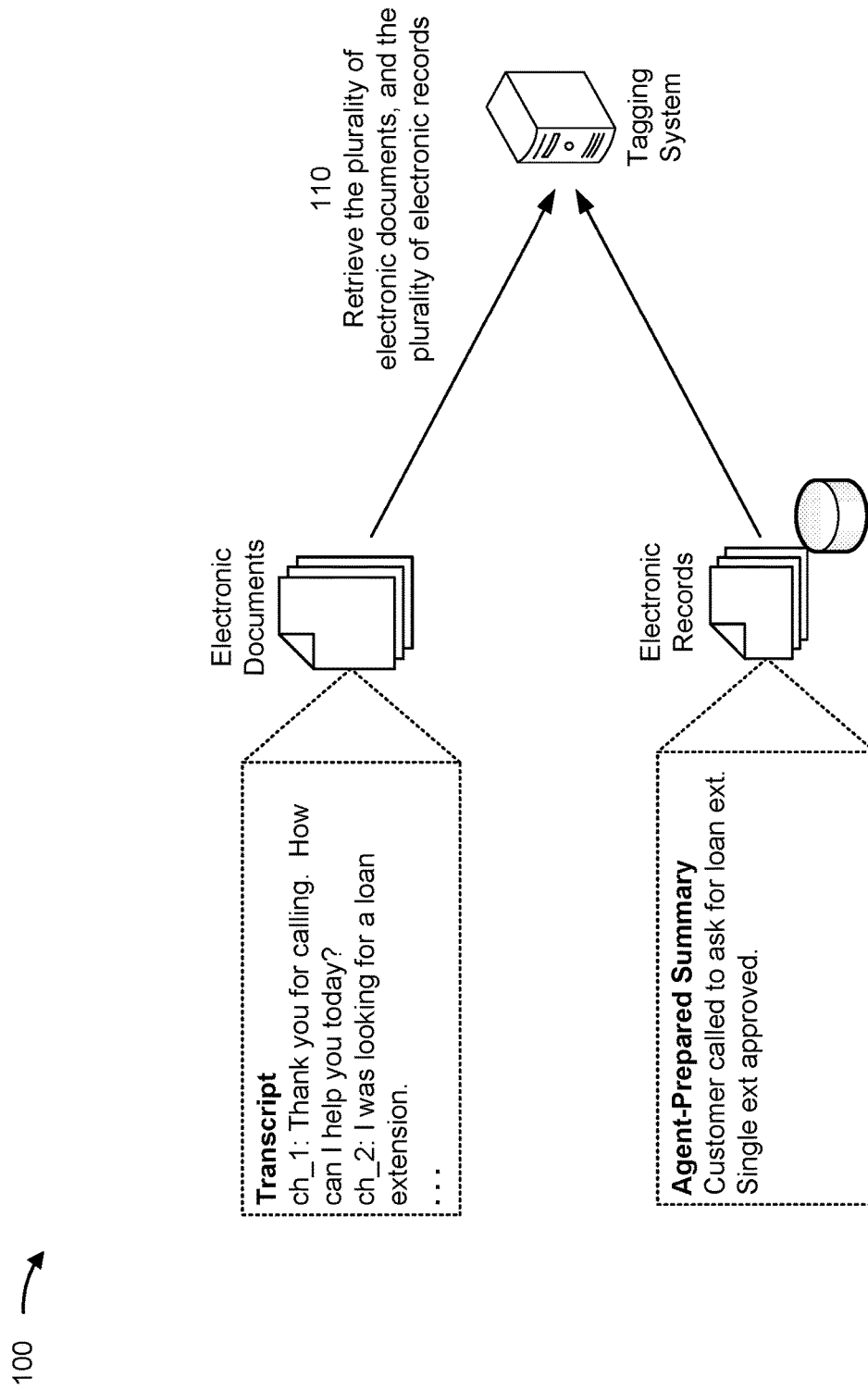

As shown in FIG. 1B, and by reference number 110, the tagging system may retrieve the plurality of electronic documents, that provide transcripts relating to the plurality of telecommunication interactions (e.g., conversations), and the plurality of electronic records that provide agent-prepared summaries relating to the plurality of telecommunication interactions. For example, the tagging system may obtain a plurality of transcripts relating to conversations, and a plurality of agent-prepared summaries relating to the conversations. The tagging system may retrieve the electronic documents and/or the electronic records from one or more document repositories. Additionally, or alternatively, the tagging system may retrieve the electronic documents and/or the electronic records from one or more data structures, such as one or more databases.

Figure 1C:
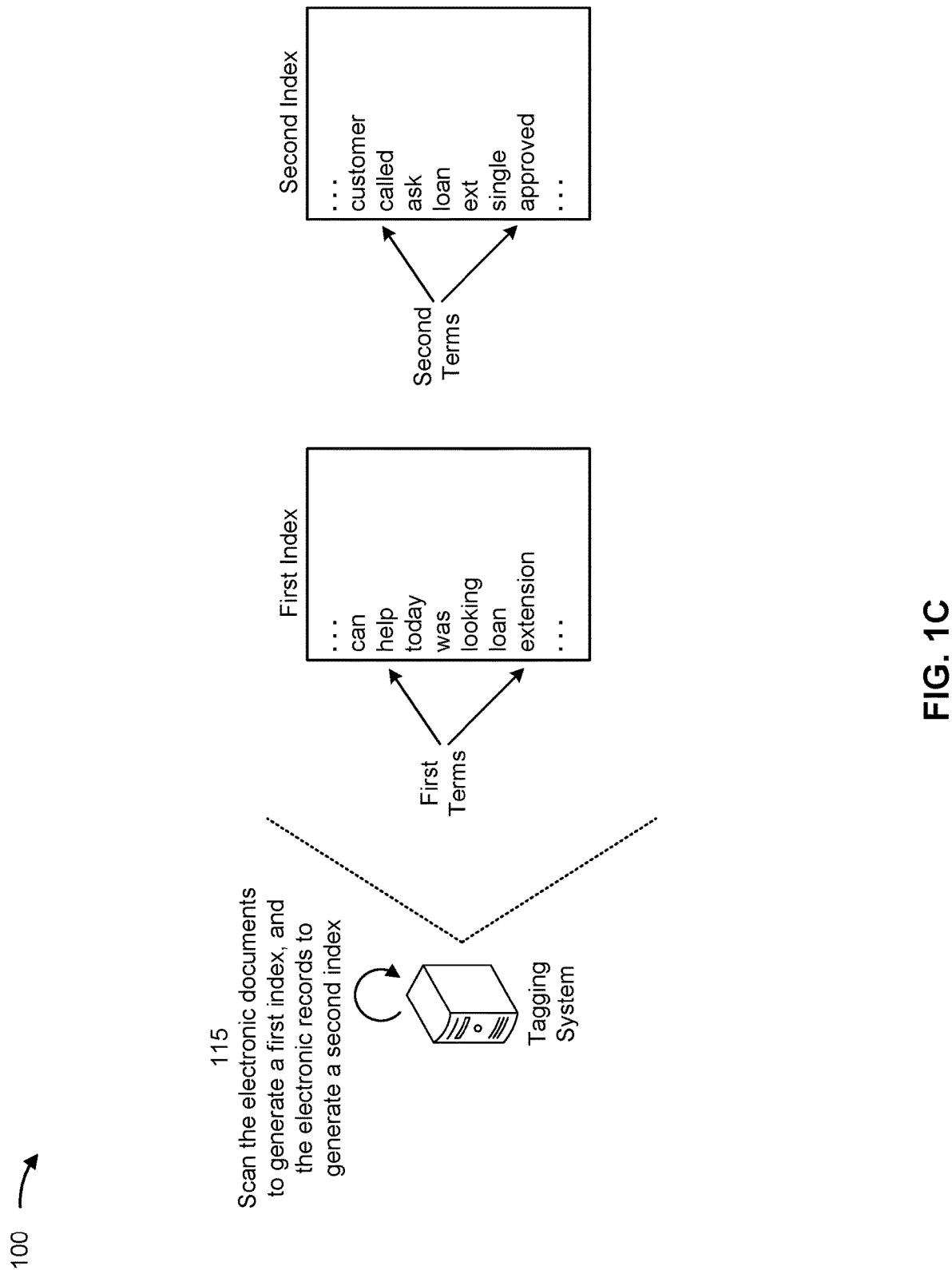

As shown in FIG. 1C, and by reference number 115, the tagging system may scan the electronic documents to generate a first index, and scan the electronic records to generate a second index (e.g., the tagging system may generate the first index and the second index). The first index (which may also be referred to as a "first vocabulary") may indicate first terms present in the transcripts, and the second index (which may also be referred to as a "second vocabulary") may indicate second terms present in the agent-prepared summaries. A "term" may include a word, an abbreviation, an acronym, or the like. An "index" may include information identifying a collection of terms. The information may be stored in one or more data structures, such as one or more databases. The information may be formatted as an index (e.g., as a list) or may be in another format from which the index can be derived (e.g., the information may be in a tabular format of a database). The first index and the second index may define a plurality of term pairs, where each term pair includes a first term of the first index and a second term of the second index. In other words, a term pair includes one term present in the transcripts and one term present in the agent-prepared summaries. In some implementations, the plurality of term pairs may be limited to term pairs that co-occur in mapped transcripts and agent-prepared summaries.

In some implementations, in connection with scanning the electronic documents and/or the agent-prepared summaries, the tagging system may extract respective sets of terms from each of the transcripts and each of the agent-prepared summaries. For example, the tagging system may parse a transcript of an electronic document and/or an agent-prepared summary of an electronic record using a regular expression or a delimiter (e.g., a space character) to extract the respective sets of terms. Moreover, the tagging system may process the sets of terms to remove noise and/or to improve their state (e.g., the tagging system may pre-process the transcripts and the agent-prepared summaries). For example, the tagging system may process the sets of terms to remove numbers, to correct misspellings, and/or to combine phrases into single terms (e.g., combine "bank account" to "bank_account"), among other examples. In some implementations, the tagging system may identify phrases in a set of terms using an AI model, such as a natural language processing (NLP) model or a neural network model, among other examples. For example, the AI model may be configured to identify phrases in unstructured text based on parts of speech. In some implementations, the tagging system may process the set of terms to remove common words (e.g., "a," "the," "it," "and," or the like). Based on the processed sets of terms, the tagging system may generate the first index (e.g., based on the sets of terms associated with the transcripts) and the second index (e.g., based on the sets of terms associated with the agent-prepared summaries).

Figure 1D:
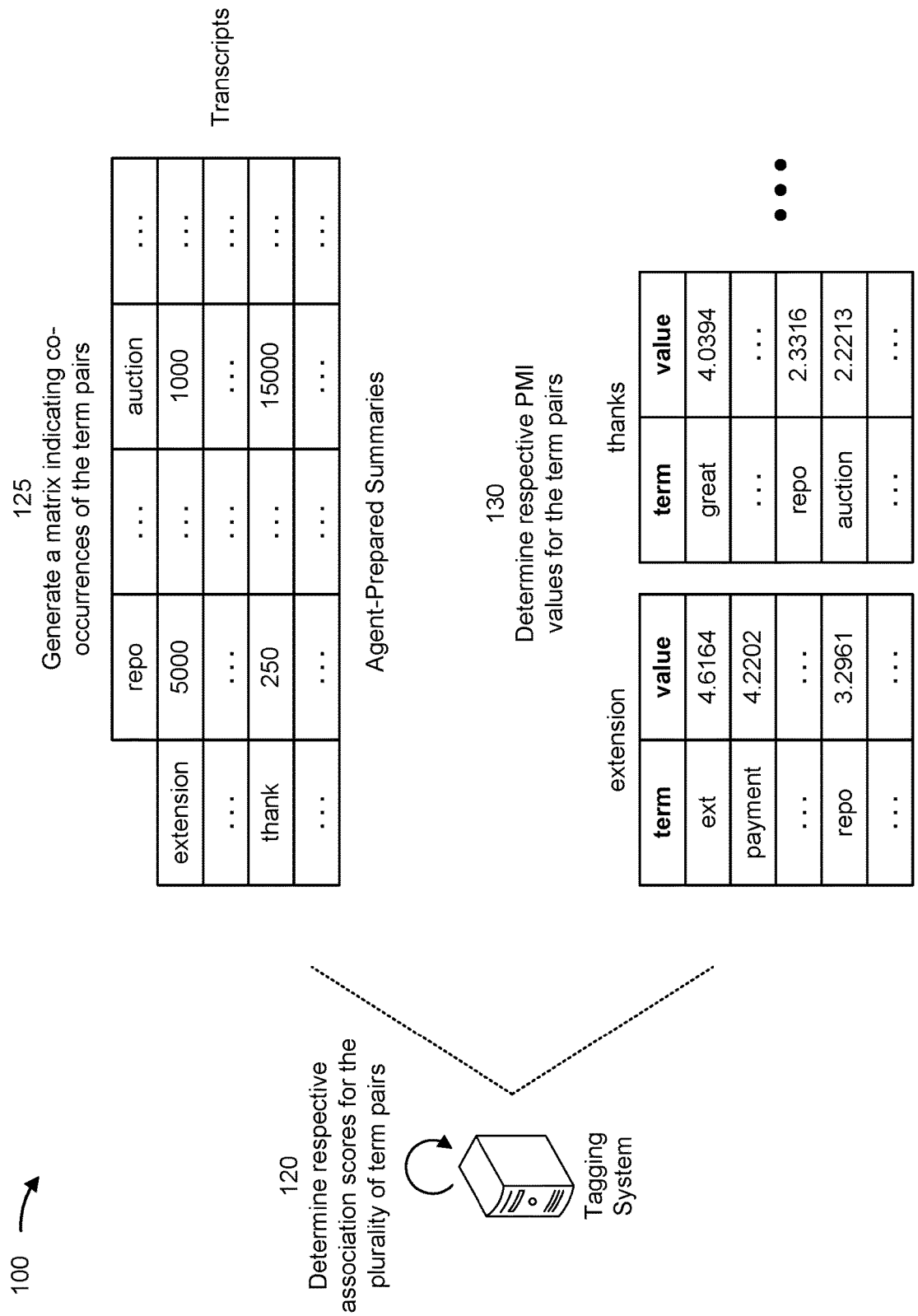

As shown in FIG. 1D, and by reference number 120, the tagging system may determine respective association scores for the plurality of term pairs. For example, the tagging system may determine a plurality of association scores, based on the first index and the second index, and the association scores may indicate an association score for each term pair of the first terms with the second terms. In particular, the association scores may be based on occurrences of the first terms in the transcripts and occurrences of the second terms in the agent-prepared summaries. An "association score" may indicate a degree of association between terms of a term pair based on the corpus of transcripts mapped to agent-prepared summaries. In some implementations, an association score may be a pointwise mutual information (PMI) value or a normalized PMI (NPMI) value.

As shown by reference number 125, to determine the association scores, the tagging system may generate a matrix indicating co-occurrences of the term pairs in the electronic documents and the electronic records. A "co-occurrence" indicates that a first term of a term pair is present in a transcript and a second term of the term pair is present in an agent-prepared summary mapped to the transcript. In one example, the tagging system may generate the matrix by iterating through all data points (e.g., transcripts mapped to agent-generated summaries), and monitoring counts of co-occurrences of term pairs in the data points. In some implementations, the matrix may indicate counts of co-occurrences for the term pairs. In some implementations, the matrix may indicate joint probabilities for the term pairs, where a joint probability for a term pair may correspond to a co-occurrence count for the term pair divided by a total number of data points.

As shown by reference number 130, to determine the association scores, the tagging system may determine, based on the matrix, respective PMI values for the term pairs. For example, the PMI values may be based on the co-occurrence counts and/or the joint probabilities indicated by the matrix. The association scores may be the PMI values. In some implementations, the tagging system may normalize the PMI values to obtain NPMI values, and the association scores may be the NPMI values.

"PMI" may refer to a measure of association between the outcomes of two random variables. The tagging system may determine the PMI values according to Equation 1:

$$pmi(w_t, w_n) = \log\frac{p(w_t, w_n)}{p(w_t)p(w_n)} = \log\frac{p(w_t \mid w_n)}{p(w_t)} \quad \text{Equation 1}$$

where $w_t$ is a term of the first terms present in the transcripts, $w_n$ is a term of the second terms present in the agent-prepared summaries, $p(w_t)$ is a probability of a term $w_t$ being present in a transcript (e.g., a number of transcripts containing the term divided by a total number of data points), $p(w_n)$ is a probability of a term $w_n$ being present in an agent-prepared summary (e.g., a number of agent-prepared summaries containing the term divided by a total number of data points), $p(w_t, w_n)$ is a probability of a term $w_t$ being present in a transcript and a term $w_n$ being present in an agent-prepared summary (e.g., a number of mapped transcripts and agent-prepared summaries that include the terms divided by a total number of data points), and $p(w_t|w_n)$ is a probability (e.g., a conditional probability) that a term $w_t$ will be present in a transcript if a term $w_n$ is present in an agent-prepared summary.

NPMI is a variant of PMI with a normalization factor that reduces an impact of infrequent words and limits NPMI values to a range from −1 to 1. The tagging system may determine the NPMI values according to Equation 2:

$$npmi(w_t, w_n) = \frac{pmi(w_t, w_n)}{(-\log p(w_t, w_n))} \quad \text{Equation 2}$$

Figure 1E:
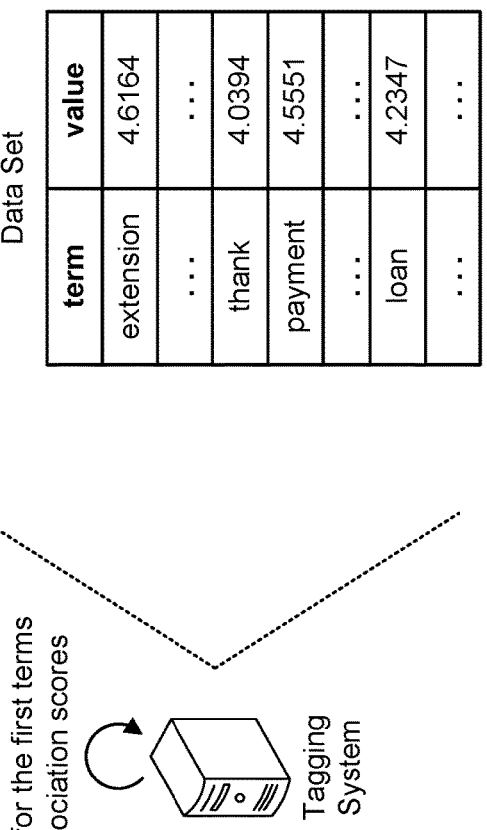

As shown in FIG. 1E, and by reference number 135, the tagging system may generate a data set that indicates a plurality of scores for the first terms present in the transcripts based on the association scores (e.g., association scores between the first terms and the second terms present in the agent-prepared summaries). For example, the scores may be based on respective highest association scores for the first terms. As an example, for each first term, the tagging system may map the first term to a highest association score of the association scores associated with term pairs that include the first term (e.g., the association score associated with a second term that is most strongly associated with the first term), and the score for the first term may be the highest association score. Additionally, or alternatively, the data set may indicate an additional plurality of scores for the second terms present in the agent-prepared summaries based on the association scores. For example, the tagging system may score the second terms in a similar manner as described above.

The tagging system may store the data set (e.g., in a data structure, such as a database) for subsequent use, as described below. The data set may be static, or relatively static over long stretches of time (e.g., weeks, months, or years). In some implementations, the tagging system may generate an updated data set, in a similar manner as described above, as additional telecommunication interactions occur (e.g., based only on the additional telecommunication interactions or based on a combination of the original telecommunication interactions and the additional telecommunication interactions).

Figure 1F:
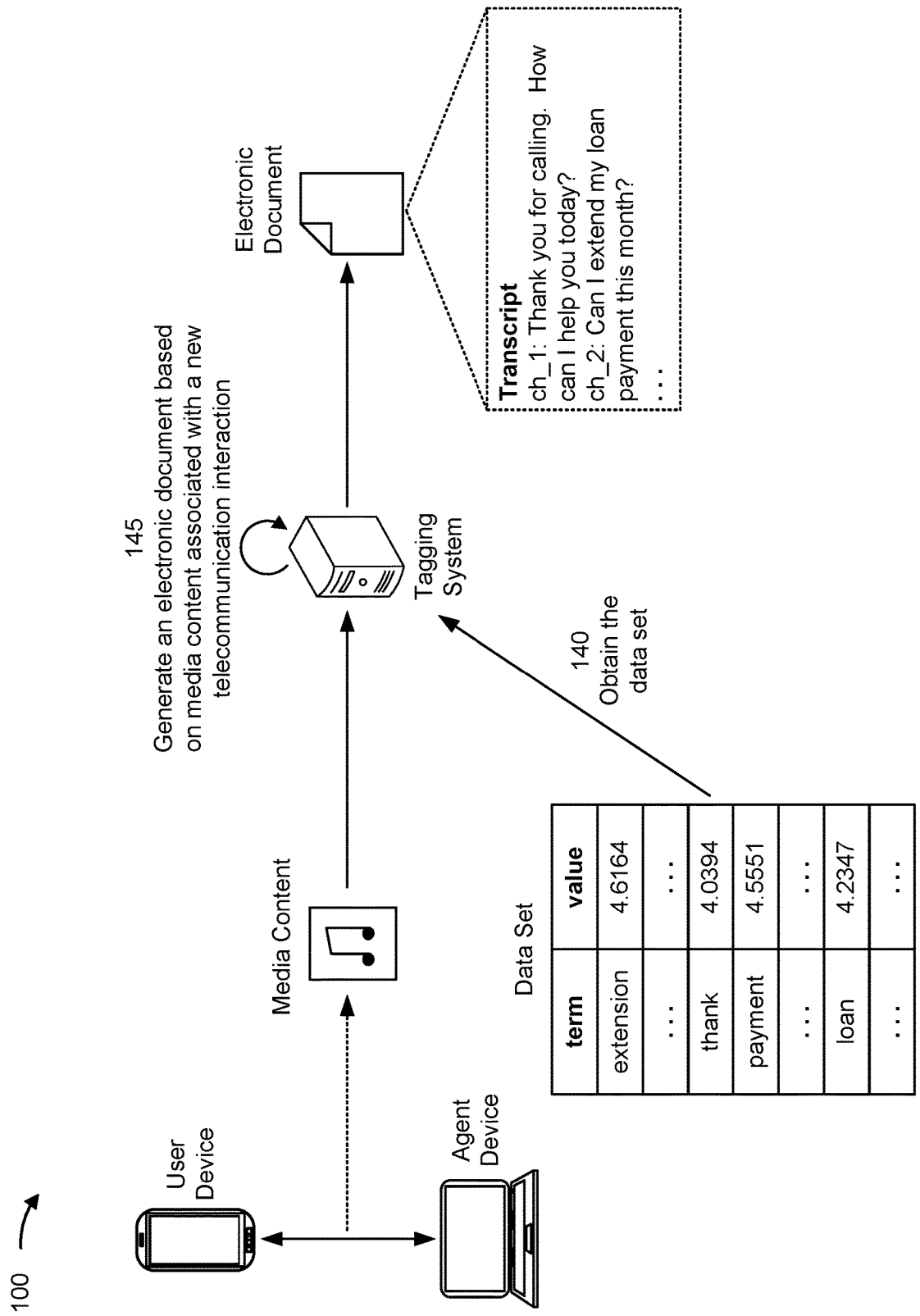

As shown in FIG. 1F, and by reference number 140, the tagging system may obtain the data set (e.g., retrieve the data set from a storage location). For example, the tagging system may obtain the data set responsive to a new telecommunication interaction occurring. As an example, the tagging system may obtain the data set responsive to receiving a request (e.g., based on a user input) to generate one or more tags for the new telecommunication interaction. In a similar manner as described above, the new telecommunication interaction may be between an agent device associated with an agent and a user device associated with a user (e.g., the new telecommunication interaction may relate to a conversation between the agent and the user).

As shown by reference number 145, the tagging system may generate an electronic document based on media content (e.g., retrieved by the tagging system from a document repository) associated with the new telecommunication interaction, in a similar manner as described above. For example, the tagging system may generate a transcript of a conversion associated with the new telecommunication interaction. In some implementations, the tagging system may process the media content, containing audio of the new telecommunication interaction, using a speech-to-text technique to generate text associated with the new telecommunication interaction, in a similar manner as described above. Continuing with the example, the tagging system may generate, based on the text, the electronic document that provides a transcript associated with the new telecommunication interaction. In some implementations, the tagging system may generate the text and/or the electronic document in real time during the new telecommunication interaction, in a similar manner as described above.

Figure 1G:
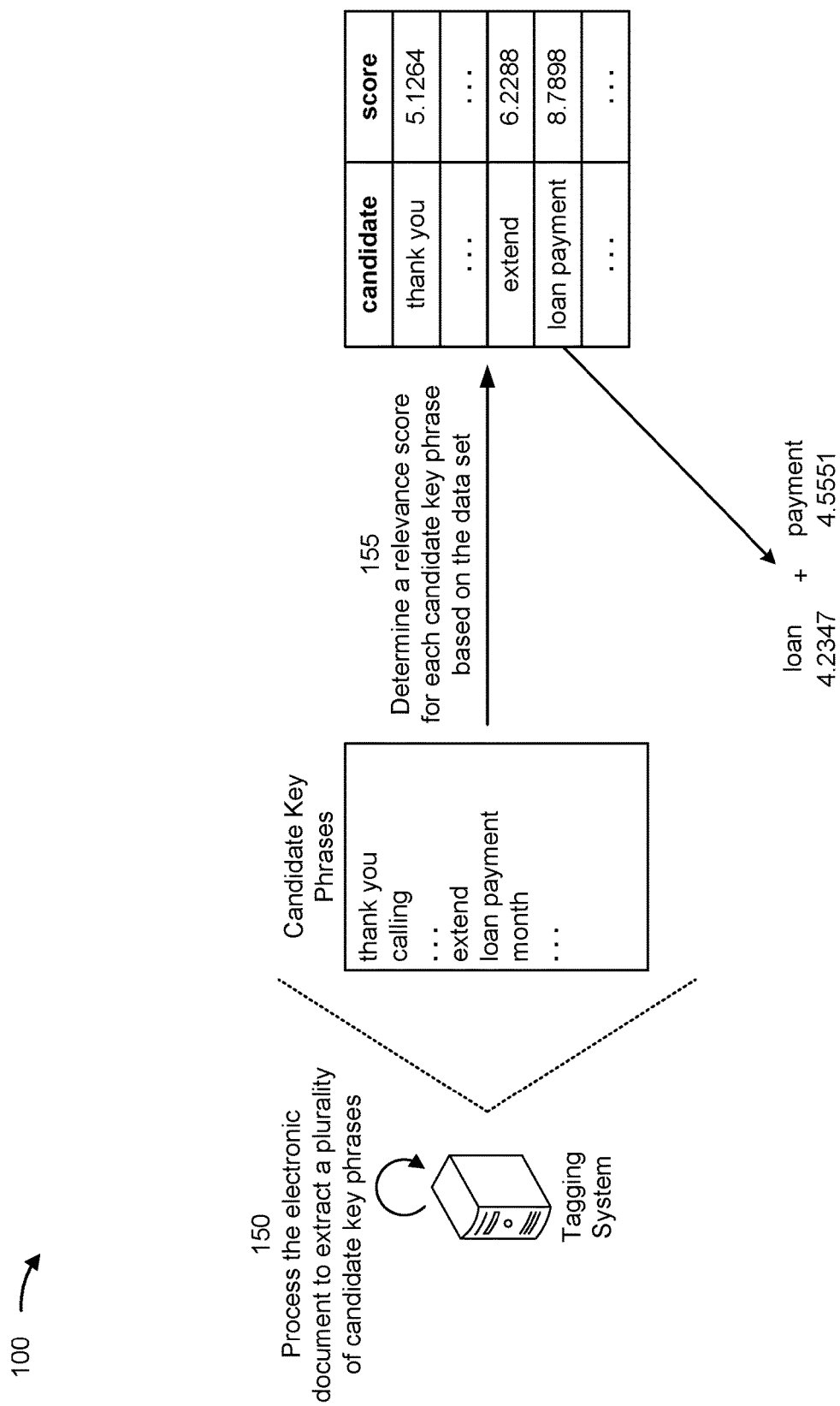

As shown in FIG. 1G, and by reference number 150, the tagging system may process the electronic document, that provides the transcript, to extract a plurality of candidate key phrases from the transcript. For example, the tagging system may extract the candidate key phrases from the transcript based on parts of speech associated with terms in the transcript. As an example, the tagging system may process the electronic document, using the AI model described above, to extract the candidate key phrases. The candidate key phrases represent a set of possible tags for the new telecommunication interaction. A candidate key phrase may include one or more terms that are adjacent in the transcript. For example, in the sentence "thank you for opening a bank account with Main Street Bank," the candidate key phrases may include "thank you," "for," "opening," "a," "bank account," "with," and "Main Street Bank." Thus, a candidate key phrase may include a combination of multiple adjacent terms in the transcript. In some implementations, the tagging system may process the extracted candidate key words to remove numbers, to correct misspellings, and/or to remove common words (e.g., "a," "the," "it," "and," or the like), among other examples, in a similar manner as described above.

A candidate key phrase may include one or more of the first terms of the first index. As shown by reference number 155, the tagging system may determine a relevance score for each candidate key phrase based on the data set (e.g., the tagging system may determine a plurality of relevance scores, for the plurality of candidate key phrases, based on the data set). For example, the tagging system may determine a relevance score for each candidate key phrase based on one or more scores, of the data set, associated with one or more first terms in the candidate key phrase. As an example, a relevance score for a candidate key phrase, that includes one or more of the first terms, is a combination of scores associated, by the data set, with the one or more first terms.

In some implementations, to determine a relevance score for a candidate key phrase, the tagging system may identify one or more of the first terms in the candidate key phrase. For example, the tagging system may split the candidate key phrase into its constituent terms. The tagging system may identify, based on the data set, respective scores associated with the one or more first terms in the candidate key phrase. For example, in the candidate key phrase "loan payment extension," the data set may indicate a first score (e.g., 0.1) for the term "loan," a second score (e.g., 0.4) for the term "payment," and a third score (e.g., 0.25) for the term "extension." The tagging system may combine the respective scores to obtain the relevance score for the candidate key phrase. For example, the combination of the scores may be a sum of the scores, a product of the scores, a weighted sum of the scores, a weighted product of the scores, or the like.

Figure 1H:
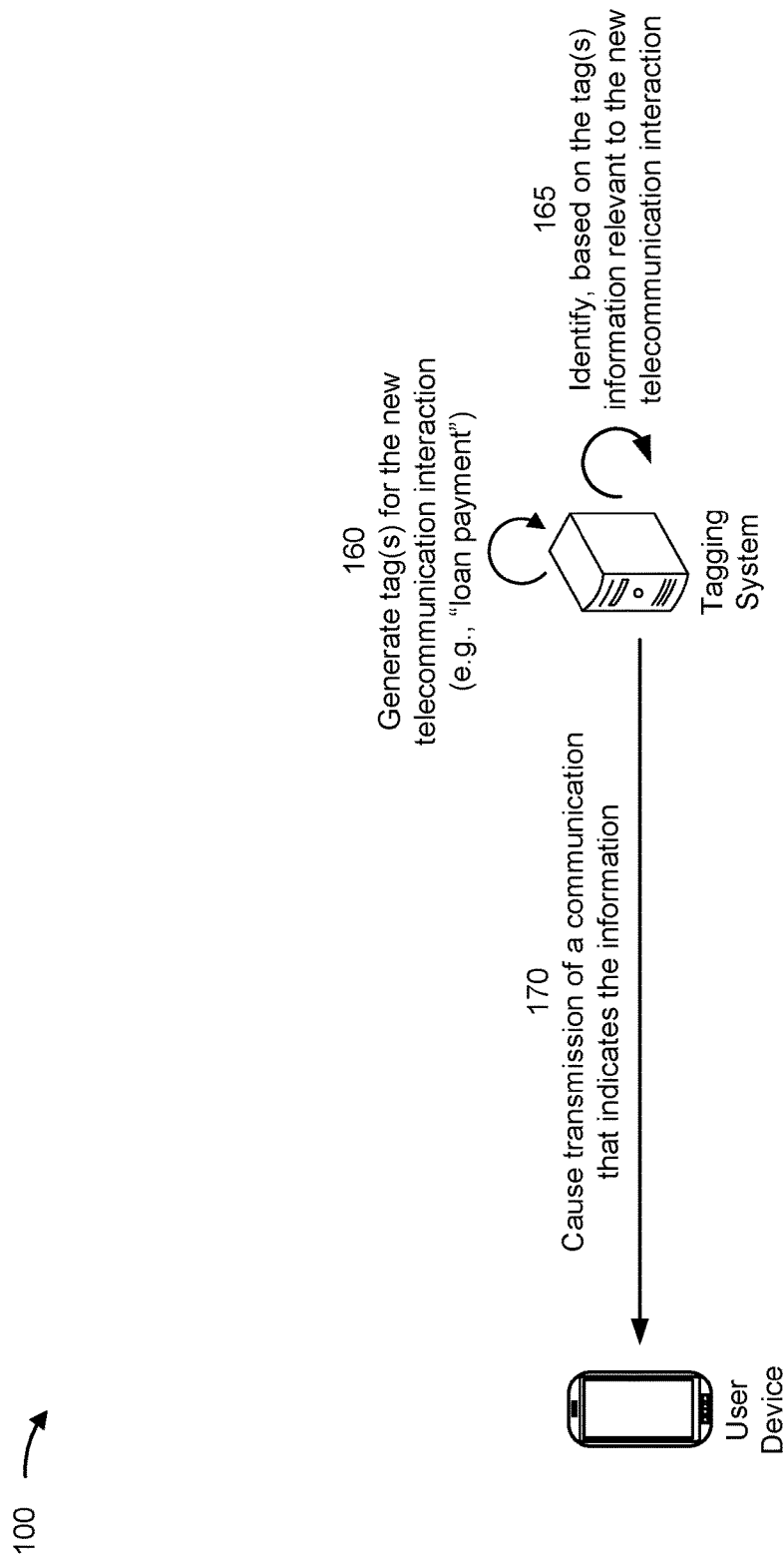

As shown in FIG. 1H, and by reference number 160, the tagging system may generate one or more tags for the new telecommunication interaction (e.g., for the electronic document and/or the transcript). For example, the tagging system may generate the tag(s) based on one or more candidate key phrases associated with highest relevance scores. As an example, the tagging system may sort the candidate key phrases in descending order of relevance score, and generate tags based on the top K candidate key phrases, where K is a positive integer such as 1, 5, 10, 20, or the like. Generating a tag may include generating a tag element, which may be text for the tag, style information for the text (e.g., a style for displaying the tag), and/or code that accompanies the text (e.g., code that triggers an action when the text is selected, such as an action to retrieve information relating to other telecommunication interactions associated with the same tag). The tagging system may store information associating the one or more tags with the new telecommunication interaction (e.g., with the electronic document and/or the transcript).

As shown by reference number 165, the tagging system may identify, based on the one or more tags, information relevant to the new telecommunication interaction. For example, the one or more tags may be indicative of one or more topics discussed in the new telecommunication interaction, and the information may relate to the one or more topics. As an example, if a tag is "line of credit," then the information may relate to line of credit services offered by an entity. In some implementations, the information may include a link (e.g., a hyperlink) to a web page, to a mobile application, to an extended reality application, or the like, that provides additional information and/or an application form relevant to the new telecommunication interaction, among other examples.

As shown by reference number 170, the tagging system may cause transmission of a communication, for the user, that indicates the information. As shown, the communication may be received at the user device associated with the user. The communication may include an email message, a text message, a push notification, an automated telephone call, or the like. In this way, the communication may supplement the new telecommunication interaction to reduce follow-up telecommunication interactions made by the user, thereby conserving telecommunication resources (e.g., network resources) and/or computing resources of a call center or of the user device.

In some implementations, the tagging system may determine, based on the association scores for the term pairs, as described above, one or more topics absent from the new telecommunication interaction. For example, if one of the first terms is present in the transcript, but one or more of the second terms most highly associated with the first term (e.g., based on the association scores) are not present in an agent-prepared summary mapped to the transcript, then the tagging system may determine that one or more topics indicated by the one or more second terms were not discussed in the new telecommunication interaction. Based on determining that the one or more topics are absent from the new telecommunication interaction, the tagging system may perform one or more actions. For example, the tagging system may cause transmission of a notification, for the agent or a supervisor of the agent, indicating the one or more topics. As another example, the tagging system may cause transmission of a communication, for the user, indicating information relating to the one or more topics (e.g., to supplement the new telecommunication interaction). As an additional example, the tagging system may generate a telecommunication event for an additional telecommunication interaction for the user (e.g., a follow-up telephone call, text chat session, or the like).

In some implementations, the tagging system may determine, based on the tag(s), that the new telecommunication interaction involved the discussion of topics that are blacklisted (e.g., one or more tags may be included in a blacklist). Based on determining that the new telecommunication interaction involved the discussion of topics that are blacklisted, the tagging system may perform one or more actions. For example, the tagging system may cause the electronic document to be flagged. As another example, the tagging system may cause transmission of a notification, for the agent or a supervisor of the agent, indicating that a blacklisted topic was discussed.

In some implementations, the tagging system may obtain an electronic record that provides an agent-prepared summary associated with (e.g., mapped to) the electronic document that provides the transcript. The agent-prepared summary may include undefined terms, such as abbreviations or other shorthand. The tagging system may identify the one or more undefined terms (e.g., that are included in the second terms) in the agent-prepared summary (e.g., by referencing terms in the agent-prepared summary against a dictionary). For each undefined term, the tagging system may identify one of the first terms having a highest association score with the undefined term (e.g., indicating that the first term and the undefined term refer to the same concept), based on the association scores determined as described in connection with reference number 120. The tagging system may update the electronic record, or generate a new electronic record, to replace or supplement the undefined term with the first term associated with the highest association score.

The tagging system may perform analytics after multiple telecommunication interactions have been tagged in the manner described herein. In some implementations, the tagging system may obtain a plurality of tags that have been associated with multiple telecommunication interactions. In some implementations, the plurality of tags may have associations to telecommunication interactions that are also tagged with one or more tags indicating a negative sentiment (e.g., an "angry" tag, an "upset" tag, or the like). The tagging system may determine, using a machine learning model, groupings of the plurality of tags into a plurality of clusters. The plurality of clusters may indicate respective topics (e.g., topics associated with telecommunication interactions involving negative sentiment). The tagging system may generate a report indicating a prevalence of the respective topics based on associations between the plurality of tags and the multiple telecommunication interactions. For example, numerous telecommunication interactions being tagged with a tag associated with a topic may indicate a high prevalence of the topic, whereas few telecommunication interactions being tagged with a tag associated with a topic may indicate a low prevalence of the topic. The report may facilitate identification of topics that are frequently the subject of telecommunication interactions (e.g., that are associated with negative sentiment) so that measures can be taken to preemptively address or provide information on these topics to reduce a volume of telecommunication interactions.

By using the techniques described herein, telecommunication interactions can be tagged efficiently and accurately. For example, by using two different types of sources (e.g., the transcripts and the mapped agent-prepared summaries), telecommunication interactions can be tagged accurately even if the transcripts are vague, lengthy, include transcription errors, and/or excessive noise. The accurate tagging of the telecommunication interactions conserves computing resources expended in connection with downstream uses of the transcripts. For example, accurate tagging may enable transcripts of interest to be located using fewer attempts, thereby conserving computing resources associated with locating transcripts.

As indicated above, FIGS. 1A-1H are provided as an example. Other examples may differ from what is described with regard to FIGS. 1A-1H.

FIG. 2 is a diagram of an example environment 200 in which systems and/or methods described herein may be implemented. As shown in FIG. 2, environment 200 may include a tagging system 210, a user device 220, an agent device 230, and a network 240. Devices of environment 200 may interconnect via wired connections, wireless connections, or a combination of wired and wireless connections.

The tagging system 210 may include one or more devices capable of receiving, generating, storing, processing, providing, and/or routing information associated with tagging telecommunication interactions, as described elsewhere herein. The tagging system 210 may include a communication device and/or a computing device. For example, the tagging system 210 may include a server, such as an application server, a client server, a web server, a database server, a host server, a proxy server, a virtual server (e.g., executing on computing hardware), or a server in a cloud computing system. In some implementations, the tagging system 210 may include computing hardware used in a cloud computing environment.

The user device 220 may include one or more devices capable of receiving, generating, storing, processing, and/or providing information associated with a telecommunication interaction, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The agent device 230 may include one or more devices capable of receiving, generating, storing, processing, and/or providing information associated with a telecommunication interaction, as described elsewhere herein. The agent device 230 may include a communication device and/or a computing device. For example, the agent device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. Additionally, or alternatively, the agent device 230 may include a server, a virtual server (e.g., executing on computing hardware), or a server in a cloud computing system.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
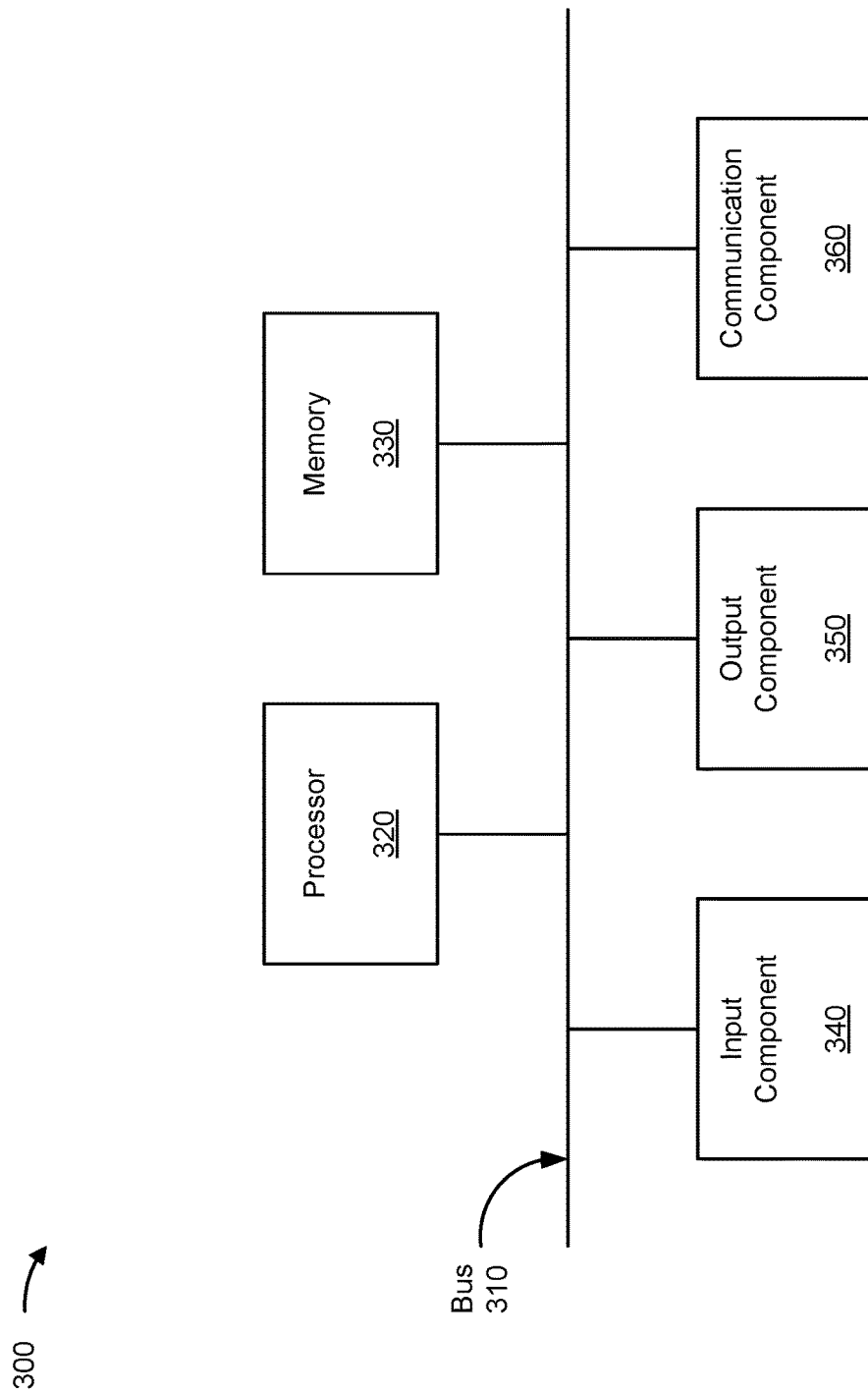
FIG. 3 is a diagram of example components of a device associated with tagging telecommunication interactions, in accordance with some embodiments of the present disclosure.

FIG. 3 is a diagram of example components of a device 300 associated with tagging telecommunication interactions. The device 300 may correspond to tagging system 210, user device 220, and/or agent device 230. In some implementations, tagging system 210, user device 220, and/or agent device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
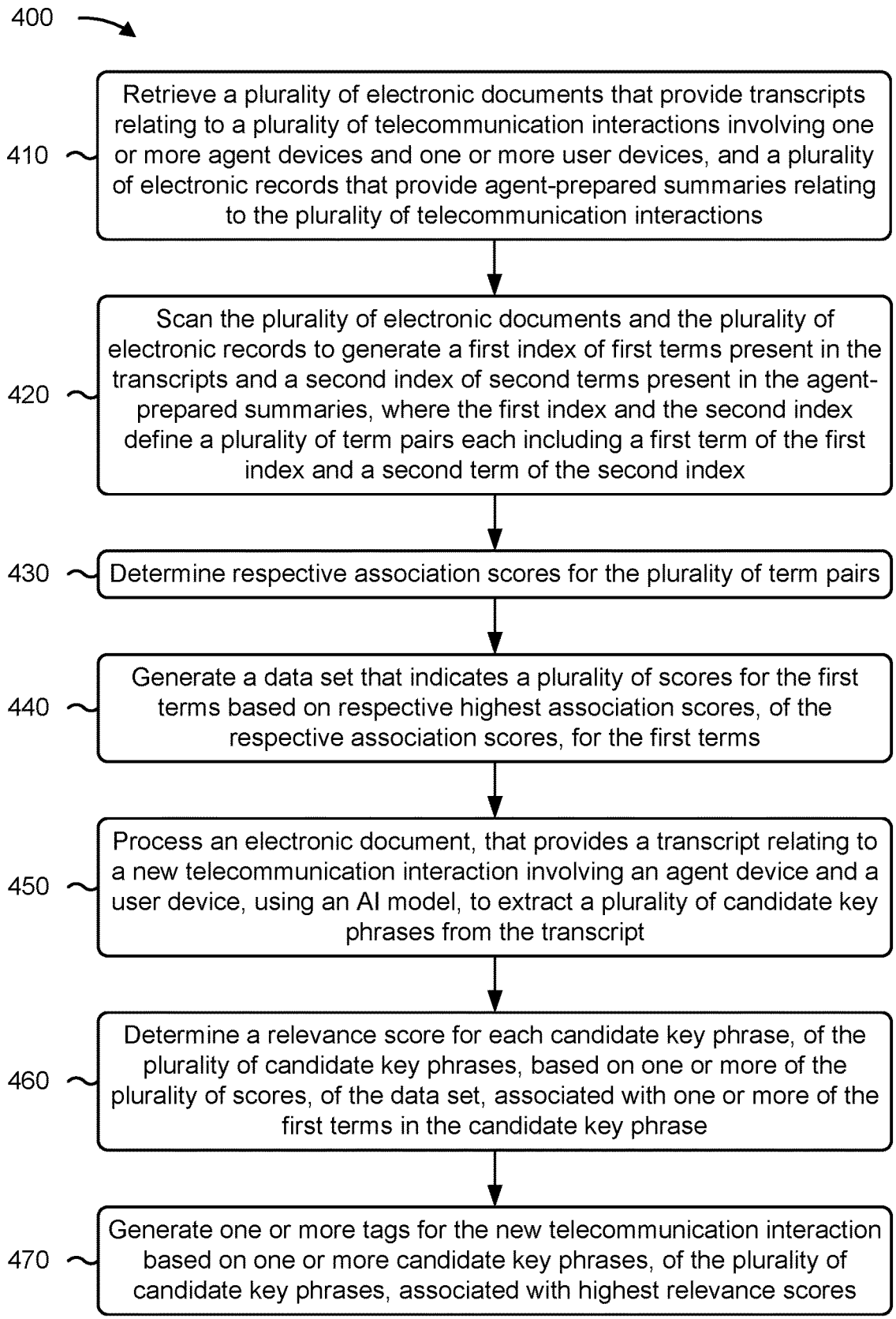
FIG. 4 is a flowchart of an example process associated with tagging telecommunication interactions, in accordance with some embodiments of the present disclosure.

FIG. 4 is a flowchart of an example process 400 associated with tagging telecommunication interactions. In some implementations, one or more process blocks of FIG. 4 may be performed by the tagging system 210. In some implementations, one or more process blocks of FIG. 4 may be performed by another device or a group of devices separate from or including the tagging system 210, such as the user device 220 and/or the agent device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include retrieving a plurality of electronic documents that provide transcripts relating to a plurality of telecommunication interactions involving one or more agent devices and one or more user devices, and a plurality of electronic records that provide agent-prepared summaries relating to the plurality of telecommunication interactions (block 410). For example, the tagging system 210 (e.g., using processor 320, memory 330, and/or communication component 360) may retrieve a plurality of electronic documents, and a plurality of electronic records, as described above in connection with reference number 110 of FIG. 1B. As an example, the transcripts and the agent-prepared summaries may relate to conversations between agents associated with the agent devices and users associated with the user devices.

As further shown in FIG. 4, process 400 may include scanning the plurality of electronic documents and the plurality of electronic records to generate a first index of first terms present in the transcripts and a second index of second terms present in the agent-prepared summaries, where the first index and the second index define a plurality of term pairs each including a first term of the first index and a second term of the second index (block 420). For example, the tagging system 210 (e.g., using processor 320 and/or memory 330) may scan the plurality of electronic documents and the plurality of electronic records to generate a first index of first terms present in the transcripts and a second index of second terms present in the agent-prepared summaries, as described above in connection with reference number 115 of FIG. 1C. As an example, the tagging system 210 may parse transcripts and/or agent-prepared summaries (e.g., using a regular expression or a delimiter) to extract respective sets of terms, may process the sets of terms to remove noise and/or to improve their state, and based on the processed sets of terms, may generate the first index (e.g., based on the sets of terms associated with the transcripts) and the second index (e.g., based on the sets of terms associated with the agent-prepared summaries).

As further shown in FIG. 4, process 400 may include determining respective association scores for the plurality of term pairs (block 430). For example, the tagging system 210 (e.g., using processor 320 and/or memory 330) may determine respective association scores for the plurality of term pairs, as described above in connection with reference number 120 of FIG. 1D. As an example, the tagging system 210 may determine a plurality of association scores, based on the first index and the second index, and the association scores may indicate an association score for each term pair of the first terms with the second terms (e.g., based on occurrences of the first terms in the transcripts and occurrences of the second terms in the agent-prepared summaries).

As further shown in FIG. 4, process 400 may include generating a data set that indicates a plurality of scores for the first terms based on respective highest association scores, of the respective association scores, for the first terms (block 440). For example, the tagging system 210 (e.g., using processor 320 and/or memory 330) may generate a data set that indicates a plurality of scores for the first terms based on respective highest association scores, of the respective association scores, for the first terms, as described above in connection with reference number 135 of FIG. 1E. As an example, for each first term, the tagging system 210 may map the first term to a highest association score of the association scores associated with term pairs that include the first term (e.g., the association score associated with a second term that is most strongly associated with the first term), and the score for the first term may be the highest association score.

As further shown in FIG. 4, process 400 may include processing an electronic document, that provides a transcript relating to a new telecommunication interaction involving an agent device and a user device, using an AI model, to extract a plurality of candidate key phrases from the transcript (block 450). For example, the tagging system 210 (e.g., using processor 320 and/or memory 330) may process an electronic document, that provides a transcript relating to a new telecommunication interaction involving an agent device and a user device, using an AI model, to extract a plurality of candidate key phrases from the transcript, as described above in connection with reference number 150 of FIG. 1G. As an example, a candidate key phrase may include one or more of the first terms of the first index.

As further shown in FIG. 4, process 400 may include determining a relevance score for each candidate key phrase, of the plurality of candidate key phrases, based on one or more of the plurality of scores, of the data set, associated with one or more of the first terms in the candidate key phrase (block 460). For example, the tagging system 210 (e.g., using processor 320 and/or memory 330) may determine a relevance score for each candidate key phrase, of the plurality of candidate key phrases, based on one or more of the plurality of scores, of the data set, associated with one or more of the first terms in the candidate key phrase, as described above in connection with reference number 155 of FIG. 1G. As an example, a relevance score for a candidate key phrase, that includes one or more of the first terms, is a combination of scores associated, by the data set, with the one or more first terms.

As further shown in FIG. 4, process 400 may include generating one or more tags for the new telecommunication interaction based on one or more candidate key phrases, of the plurality of candidate key phrases, associated with highest relevance scores (block 470). For example, the tagging system 210 (e.g., using processor 320 and/or memory 330) may generate one or more tags for the new telecommunication interaction based on one or more candidate key phrases, of the plurality of candidate key phrases, associated with highest relevance scores, as described above in connection with reference number 160 of FIG. 1H. As an example, generating a tag may include generating a tag element, which may be text for the tag, style information for the text, and/or code that accompanies the text.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1H. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for tagging telecommunication interactions, the system comprising:
   one or more memories; and
   one or more processors, communicatively coupled to the one or more memories, configured to:
   generate:
      a first index of first terms present in a plurality of electronic documents which provide transcripts relating to a plurality of telecommunication interactions, and
      a second index of second terms present in a plurality of electronic records which provide agent-prepared summaries of the plurality of telecommunication interactions,
      wherein the first index and the second index define a plurality of term pairs each including a first term of the first index and a second term of the second index;
   determine respective association scores for the plurality of term pairs;
   generate a data set that indicates a plurality of scores for the first terms based on respective highest association scores, of the respective association scores, for the first terms;
   process an electronic document, that provides a transcript relating to a new telecommunication interaction involving an agent device and a user device of a user to extract a plurality of candidate key phrases that represent a set of possible tags for the new telecommunication interaction;

determine a relevance score for each candidate key phrase, of the plurality of candidate key phrases, based on one or more of the plurality of scores, of the data set, associated with one or more of the first terms in the candidate key phrase, wherein determining the relevance scores is based on receiving a request to generate one or more tags for the new telecommunication interaction;

generate the one or more tags for the new telecommunication interaction based on one or more candidate key phrases, of the plurality of candidate key phrases, associated with highest relevance scores;

identify, based on the one or more tags, additional information relevant to one or more topics discussed during the new telecommunication interaction; and cause transmission of a communication, directed to the user involved in the new telecommunication interaction, that indicates the additional information.

2. The system of claim 1, wherein the one or more processors are further configured to:

process media content containing audio of the new telecommunication interaction using a speech-to-text technique to generate text associated with the new telecommunication interaction; and generate, based on the text, the electronic document that provides the transcript.

3. The system of claim 1, wherein the one or more processors, to determine respective association scores for the plurality of term pairs, are configured to:

generate a matrix indicating co-occurrences of the plurality of term pairs in the transcripts and the agent-prepared summaries; and determine, based on the matrix, respective pointwise mutual information (PMI) values for the plurality of term pairs, wherein the respective association scores are the respective PMI values.

4. The system of claim 1, wherein the one or more processors are further configured to:

extract respective sets of terms from each of the transcripts, provided in the plurality of electronic documents and each of the agent-prepared summaries provided in the plurality of electronic records;

process the respective sets of terms to remove numbers, to correct misspellings, and to combine phrases into single terms; and generate the first index and the second index based on the respective sets of terms.

5. The system of claim 1, wherein the one or more processors are further configured to:

determine, based on the respective association scores for the plurality of term pairs, one or more topics absent from the new telecommunication interaction; and perform an action based on the one or more topics being absent from the new telecommunication interaction, the action being one or more of:

causing transmission of a notification for an agent indicating the one or more topics, causing transmission of a communication for the user indicating information relating to the one or more topics, or generating a telecommunication event for an additional telecommunication interaction for the user.

6. The system of claim 1, wherein the one or more processors are further configured to:

obtain an electronic record, that provides an agent-prepared summary, associated with the electronic document that provides the transcript;

identify an undefined term in the agent-prepared summary;

identify, based on the respective association scores, one first term, of the first terms, having a highest association score with the undefined term; and update the electronic record to replace or supplement the undefined term with the one first term.

7. A method of tagging telecommunication interactions, comprising:

generating:

a first index of first terms present in a plurality of electronic documents which provide transcripts relating to a plurality of telecommunication interactions, and a second index of second terms present in a plurality of electronic records which provide agent-prepared summaries of the plurality of telecommunication interactions, wherein the first index and the second index define a plurality of term pairs each including a first term of the first index and a second term of the second index;

obtaining, by a device, a data set that indicates a plurality of scores for first terms of the first index based on association scores between the first terms and second terms of the second index;

processing, by the device, an electronic document, that provides a transcript relating to a new telecommunication interaction involving an agent device and a user device of a user, using an artificial intelligence model, to extract a plurality of candidate key phrases from the transcript that represent a set of possible tags for the new telecommunication interaction;

determining, by the device, a relevance score for each candidate key phrase, of the plurality of candidate key phrases, based on one or more of the plurality of scores, of the data set, associated with one or more of the first terms in the candidate key phrase, wherein determining the relevance scores is based on receiving a request to generate one or more tags for the new telecommunication interaction;

generating, by the device, the one or more tags for the new telecommunication interaction based on one or more candidate key phrases, of the plurality of candidate key phrases, associated with highest relevance scores;

identifying, based on the one or more tags, additional information relevant to one or more topics discussed during the new telecommunication interaction; and causing transmission of a communication, directed to the user involved in the new telecommunication interaction, that indicates the additional information.

8. The method of claim 7, further comprising:

processing media content containing audio of the new telecommunication interaction using a speech-to-text technique to generate text associated with the new telecommunication interaction; and generating, based on the text, the electronic document that provides the transcript.

9. The method of claim 7, wherein the artificial intelligence model is configured to identify phrases in unstructured text based on parts of speech.

10. The method of claim 7, wherein the artificial intelligence model is a natural language processing model or a neural network model.

11. The method of claim 7, further comprising:
storing information associating the one or more tags with the new telecommunication interaction.

12. The method of claim 7, wherein determining the relevance score for each candidate key phrase comprises:
identifying the one or more of the first terms in the candidate key phrase;
identifying, based on the data set, respective scores, of the plurality of scores, associated with the one or more of the first terms; and
combining the respective scores to obtain the relevance score for the candidate key phrase.

13. A non-transitory computer-readable medium storing a set of instructions, the set of instructions comprising:
one or more instructions that, when executed by one or more processors of a device, cause the device to:
generate:
a first index of first terms present in a plurality of electronic documents which provide transcripts relating to a plurality of telecommunication interactions, and
a second index of second terms present in a plurality of electronic records which provide agent-prepared summaries of the plurality of telecommunication interactions;
identify, from the first index and the second index, a plurality of term pairs each including a first term of the first index and a second term of the second index;
determine respective association scores for the plurality of term pairs;
generate a data set that indicates a plurality of scores for the first terms based on respective highest association scores, of the respective association scores, for the first terms;
generate one or more tags for a new telecommunication interaction, involving an agent device and a user device of a user, based on one or more candidate key phrases of the new telecommunication interaction and based on the data set;
identify, based on the one or more tags, additional information relevant to one or more topics discussed during the new telecommunication interaction; and
cause transmission of a communication, directed to the user involved in the new telecommunication interaction, that indicates the additional information.

14. The non-transitory computer-readable medium of claim 13, wherein the one or more instructions further cause the device to:
extract respective sets of terms from each of the transcripts, provided in the plurality of electronic documents, and each of the agent-prepared summaries provided in the plurality of electronic records;
process the respective sets of terms to remove numbers, to correct misspellings, and to combine phrases into single terms; and
generate the first index and the second index based on the respective sets of terms.

15. The non-transitory computer-readable medium of claim 13, wherein the one or more instructions, that cause the device to determine respective association scores for the plurality of term pairs, cause the device to:
generate a matrix indicating co-occurrences of the plurality of term pairs in the transcripts and the agent-prepared summaries; and
determine, based on the matrix, respective pointwise mutual information (PMI) values for the plurality of term pairs,
wherein the respective association scores are the respective PMI values.

16. The non-transitory computer-readable medium of claim 13, wherein the respective association scores are respective normalized pointwise mutual information (PMI) values.

17. The non-transitory computer-readable medium of claim 13, wherein the plurality of telecommunication interactions are associated with telephone calls placed to a call center.

18. The non-transitory computer-readable medium of claim 13, wherein the plurality of telecommunication interactions are associated with text chat sessions.

19. The system of claim 1, wherein the one or more processors are further configured to:
obtain a plurality of tags, including the one or more tags, associated with multiple telecommunication interactions;
groups the plurality of tags into a plurality of clusters, wherein each cluster is associated with a respective topic; and
generate a report indicating a prevalence of the respective topics in the multiple telecommunication interactions.

20. The system of claim 1, wherein the communication includes a link to the additional information.

* * * * *